UNITED STATES PATENT OFFICE.

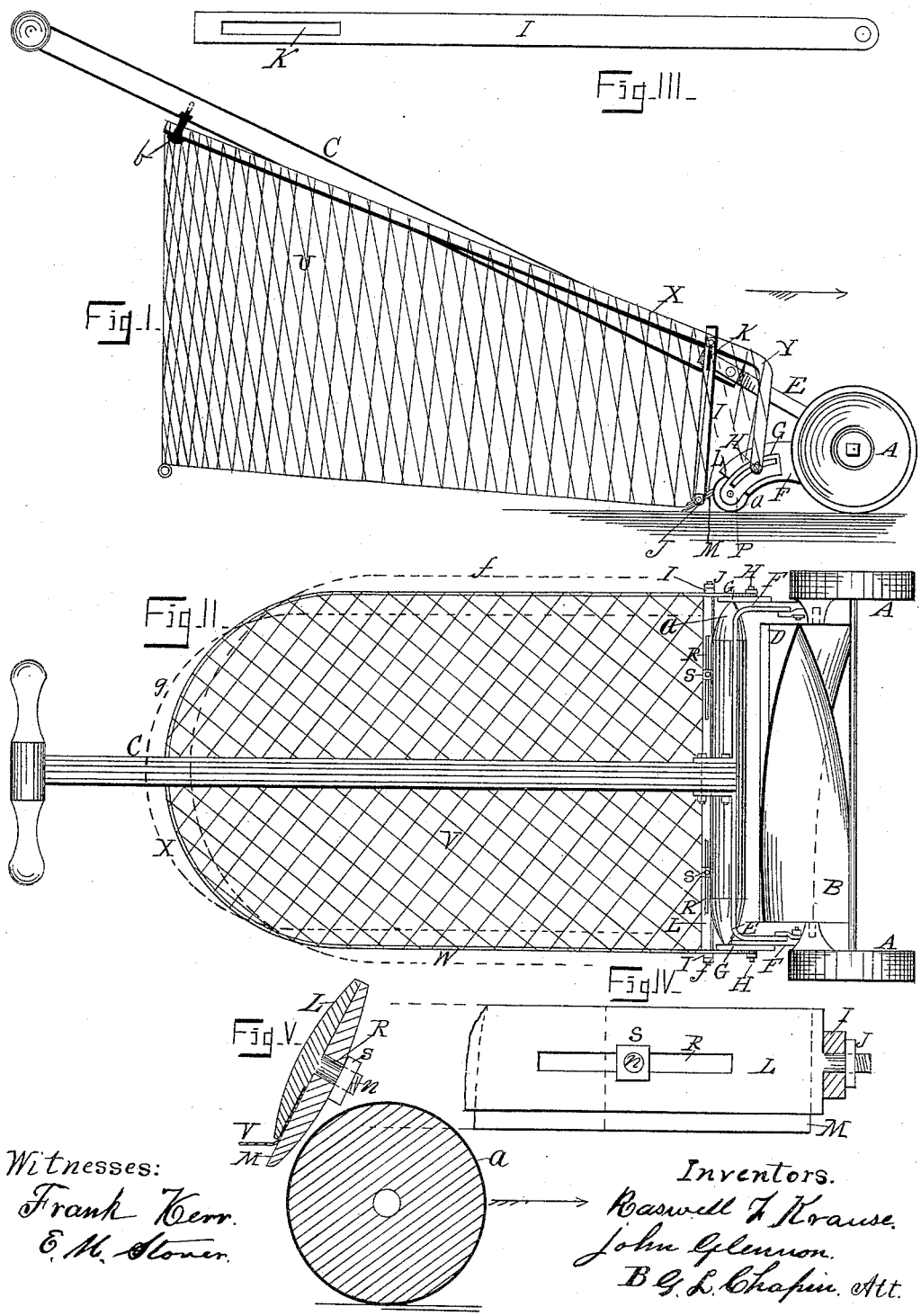

ROSWELL F. KRAUSE AND JOHN GLENNON, OF CHICAGO, ILLINOIS.

GRASS-CARRYING ATTACHMENT FOR LAWN-MOWERS.

SPECIFICATION forming part of Letters Patent No. 448,440, dated March 17, 1891.

Application filed October 17, 1890. Serial No. 368,487. (No model.)

*To all whom it may concern:*

Be it known that we, ROSWELL F. KRAUSE and JOHN GLENNON, citizens of the United States, and residents of Chicago, county of Cook, and State of Illinois, have invented new and useful Improvements in Grass-Carrying Attachments for Lawn-Mowers, of which the following is a specification, reference being had to the accompanying drawings, illustrating the invention, in which—

Figure I is a side elevation of a lawn-mower with our grass-carrying devices attached thereto. Fig. II is a top or plan view of Fig. I. Fig. III is a side view of a supporting-standard enlarged and removed. Fig. IV is an elevation of an end portion of the adjustable sack-holder three-fourths of full size. Fig. V is a cross-section of the sack-holder and ground-roller $a$, showing the sack-holder adjusted above the top of the roller.

This invention relates to such construction of grass-carrying attachments for lawn-mowers that one size can be adjusted to all ordinary mowers.

The particular novelty and construction will be fully comprehended by the following detail description.

B is the cutter, A the traveling wheels, F G the roller-attaching devices, $a$ the roller, and C E the wood and iron portions of the pushing devices, of an ordinary well-known lawn-mower. In these kinds of mowers a nut H at each side of the mower is employed to clamp the adjustable segment-pieces G G to the segment-arm supports F F. These nuts and the bolts they turn on are employed as hereinafter stated. A light flexible bail X, of suitable metal, is at its middle portion bent in a semicircular form or in substantially an easy curve, and its forward ends bent down, as shown at Fig. I, and by means of holes through them are secured to the segments F G by the nuts and bolts H. The semicircular portion of the bail is secured to the wood portion C of the pushing devices by means of an ordinary clamping-bolt $b$ or other suitable means.

To each side of the bail X by means of a bolt and nut is secured an adjustable supporting-standard I K, which extends down to the back of the roller $a$, and they are secured by nuts and bolts J to a two-part adjustable sack-holder L M. The part L is shown to have a bolt and nut J at one end to hold it to the supporting-standard I. The opposite end of the portion M is provided with a like bolt and nut, whereby when the nuts $s$ are turned on the bolts $n$, which project through the portion M, the two portions of the sack-holder will be rigid and the bottom $v$ of the sack will be tightly clamped in place, as shown at Fig. V. The bolts $n$ may be cast solid to either portion L M, or full-length bolts with heads and nuts may be employed; but one portion must be slotted, as at R, with two or more slots to permit the portions to be adjusted longitudinally on each other to suit mowers which vary in length of roller $a$ from sixteen to twenty inches, (and some vary more.) The sack is shown to be woven of fine wire and secured to the bail X and supporting-standards I in the ordinary manner of securing woven wire to a frame-work, the bottom being secured, as before stated, as at Fig. V. A fabric of flax or hemp may be employed instead of the wire-woven sack, especially when the fabric and attaching devices are to be shipped. In such case the fabric will not become permanently crimped, as wire is liable to so become. In any event when the attachment is made to be adjusted to different mowers the bottom $v$ of the fabric should be made sufficiently wide for the larger mower, and when it is attached to a smaller mower the front edge of the bottom of the fabric is to be plaited within the holder L M, and the bail X will have its form changed either wider and shorter, as shown by dotted lines $f$, or narrower and longer, as by dotted lines $g$, the metal being sufficiently flexible for that purpose. Should the sacks all be made for twenty-inch mowers, two plaits of one inch lap each will bring the bottom of a sack to the proper tension for a sixteen-inch mower.

The particular reason for making the standards I vertically adjustable is that the holder L M may be brought far enough up back of the roller $a$ to prevent the cut grass passing back into the sack from falling forward onto the roller. In case the holder is not elevated above the roller the grass falling thereon will be thrown forward onto the cutter. It will be understood that the grass cut by the mower is thrown over the roller $a$ and into the sack, and that the elevated holder prevents grass from leaving the sack till a suitable load is secured.

We claim as our invention—

A grass-carrying attachment for lawn-mowers, consisting of the flexible bail X, bent at its middle portion to bring its sides parallel, the forward portions being bent down and secured to the frame of the mower, side supporting-standards adjustably connected to the bail at their upper portions and having their lower portions attached to the transverse holder, which is longitudinally adjustable, and a sack secured to the bail, standards, and holder, as specified and shown.

ROSWELL F. KRAUSE.
JOHN GLENNON.

Witnesses:
ELLIS S. CHESBROUGH,
G. L. CHAPIN.